Dec. 22, 1942. C. F. RAUEN 2,305,897
TRANSMISSION MECHANISM
Filed Sept. 14, 1940 3 Sheets-Sheet 1
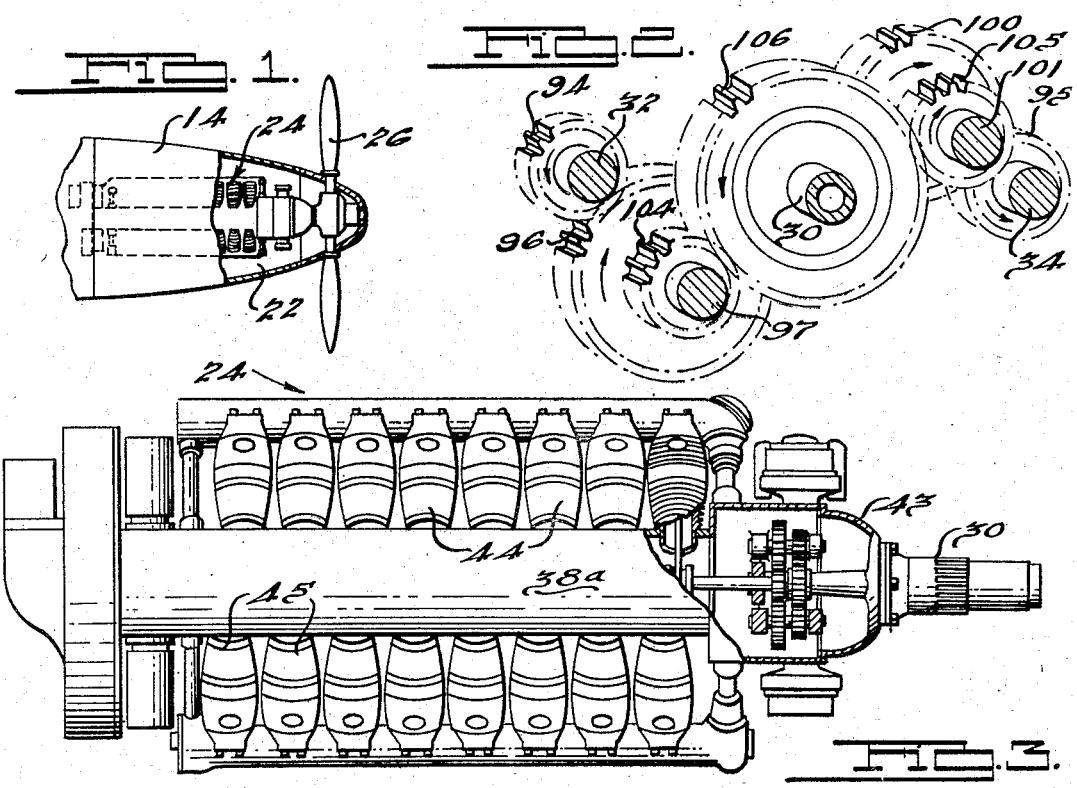
INVENTOR
Carl F. Rauen.
BY
Dike, Calver & Gray
ATTORNEYS.

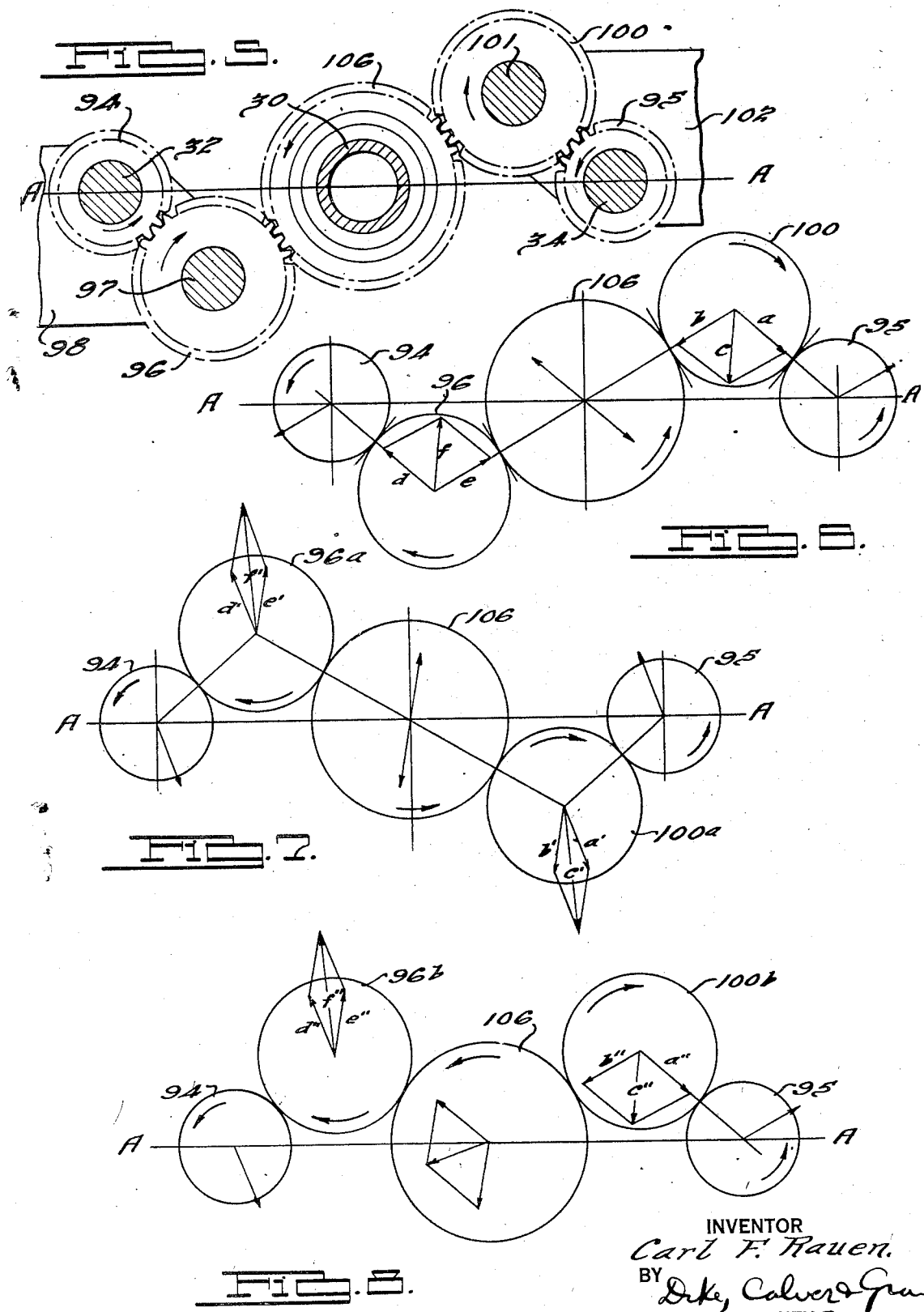

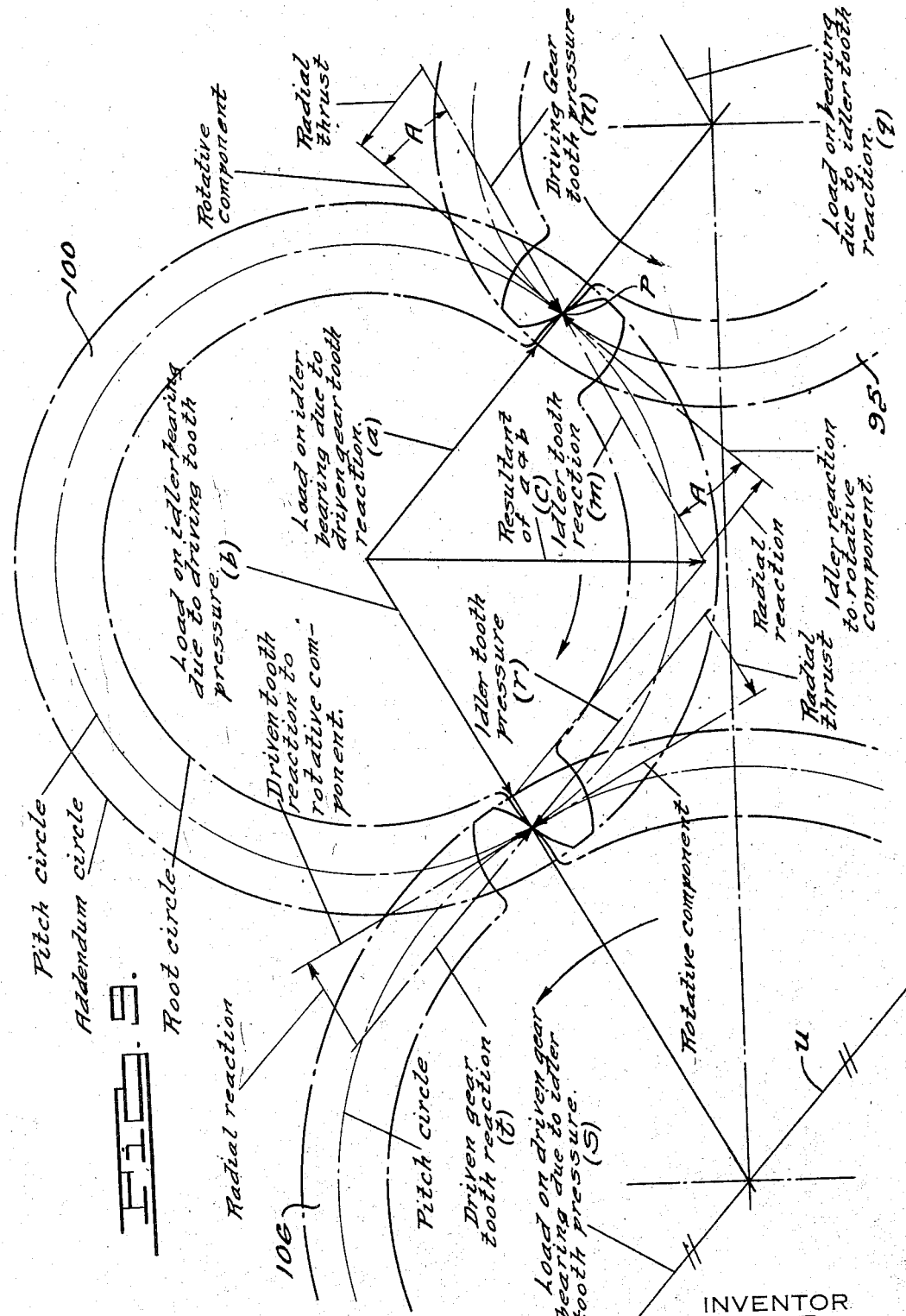

Patented Dec. 22, 1942

2,305,897

UNITED STATES PATENT OFFICE 2,305,897

TRANSMISSION MECHANISM

Carl F. Rauen, Detroit, Mich., assignor to Briggs Manufacturing Company, Detroit, Mich., a corporation of Michigan Application September 14, 1940, Serial No. 356,739

3 Claims. (Cl. 74—410)

This invention relates to aircraft and more particularly to an aircraft power plant and transmission mechanism therefor. The illustrated power plant of the aircraft embodies an engine of the internal combustion type comprising, by way of example, a number of banks of cylinders having reciprocable pistons for operating two drive shafts or crankshafts, these being arranged in parallelism and adapted to drive a centrally arranged propeller shaft.

An object of the invention is to improve the arrangement and location of certain gearing interposed between the drive or crankshaft and the propeller shaft whereby improved and more efficient operation, reduction in the weight of the transmission, greater compactness, and longer operating life are obtained.

Another object of the invention is to provide an improved reduction gear drive mechanism between spaced parallel crankshafts of an aircraft and the propeller shaft thereof wherein by an improved location or arrangement of the idler gears a reduction and equalization of the loads or forces on the idler gear bearings is obtained.

A further object of the invention is to provide an improved gear train mechanism interposed between parallel spaced crankshafts and a centrally disposed propeller shaft, which mechanism is less bulky and lighter, occupies less space, and operates more efficiently.

Another object of the invention is to provide an improved gear train mechanism interposed between parallel spaced crankshafts to drive a centrally disposed propeller shaft and so constructed as to require less frontal area whereby resistance or drag of the engine is materially reduced and greater aircraft streamlining is made possible.

Still a further object of the invention is to provide a gear train between a plurality of crankshafts and a propeller shaft in which the forces on the bearings of the idler gears are materially reduced.

Also it is an object of the invention to provide a gear train between a plurality of crankshafts and a propeller shaft in which the gear bearings of the idler gears and idler gears themselves may be relatively small thereby reducing weight and bulk of the gear train.

Another object of the invention is to provide a gear train between a plurality of drive shafts and a propeller shaft in which all the gears can be relatively small enabling lower pitch line velocities and more accurate gears.

Other objects of this invention will appear in the following description and appended claims, reference being had to the accompanying drawings forming a part of this specification wherein like reference characters designate corresponding parts in the several views.

Fig. 1 is a side elevation, partly broken away, of the front end of an airplane embodying the present invention.

Fig. 2 is a diagrammatic view illustrating in perspective the gear drive between the crankshafts and the propeller shaft.

Fig. 3 is the side elevation of an airplane engine, partly broken away, disclosing an embodiment of the present invention.

Fig. 4 is an enlarged plan view of the gear drive shown in Fig. 3.

Fig. 5 is a partly diagrammatic end view of a gear train having idler gears arranged and rotating similarly to corresponding gears of Figs. 2, 3 and 4.

Fig. 6 is a diagrammatic view giving a vector analysis of the bearing loads in the structure illustrated in Figs. 1 to 5, said view being positioned to correspond to Fig. 5, and the gears being represented by their pitch circles.

Fig. 7 is a view similar in part to Fig. 6 with the idler gears being moved respectively to the sides of the line connecting the centers of the driving gears opposite to those of Fig. 6.

Fig. 8 does not involve invention and is included in the drawings to illustrate the result of placing both idlers on the same side of the line connecting the centers of the driving gears.

Fig. 9 is a diagrammatic view giving a complete vector analysis of forces on one-half of the structure. Said view includes both the driving and reactive forces, as well as the bearing loads produced thereby.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

For the purpose of illustrating the present invention there is shown, by way of example, in the drawings a multi-cylinder internal combustion engine together with the transmission mechanism between the crankshafts of the power plant and the propeller shaft installed within a suitable airplane engine housing illustrated in Fig. 1. This engine housing comprises a fuselage 14. A streamlined engine compartment 22 houses a power plant 24 which in turn is adapted to drive a propeller 26 to propel the craft through the air.

In the present instance the power plant of the airplane comprises an engine of the double V type, as illustrated in Fig. 3. This engine is provided with oppositely inclined banks of cylinders disposed in such a manner that the outer ends of the generally upwardly and downwardly extending cylinders of spaced cylinder groups or banks are positioned to lie adjacent each other.

Referring particularly to Figs. 2 and 4, it will be seen that a centrally disposed propeller shaft 30 adapted to receive the propeller 26 is driven by spaced right and left crankshafts 32 and 34, respectively, through improved reduction gear mechanism designated as a whole at 36. The crankshafts 32 and 34 are rotatably journalled at their rear ends through the medium of suitable bearings 35 and 37 in crankcase housings 38 and 40, respectively, these housing being separated by a central truss-like housing 42. The crankcase housings 38 and 40 are accessible at their outer sides by means of convex cover plates such as 38a. As illustrated in Figs. 3 and 4, the front end or portion of the housings 38, 40, 42 may be closed by means of a concavo-convex streamlined end plate 43 rigidly secured in position. The crankcase housing 38 receives the inner ends of the generally upwardly and downwardly extending cylinder units 44 and 45 of two vertically spaced banks of cylinders, as seen in Fig. 3. Similar banks are provided opposite to those shown in Fig. 3, so that the present engine comprises four banks of cylinders. A greater or lesser number may be provided as desired. The cylinders have reciprocable pistons connected in the usual manner to the crankshafts.

Referring particularly to Fig. 4, within the crankcase housings 38 and 40 for the four banks of cylinders or engine units is located the mechanism for driving the propeller shaft 30 from the spaced parallel crankshafts 32 and 34, it being noted that the propeller shaft extends parallel to the crankshafts and is mounted centrally therebetween. In Fig. 4 fragmentary central portions and rear portions of the power plant are shown, illustrating positions of cylinders 46 and 44 and bearings 35 and 37 to which are journalled the rear ends of crankshafts 32 and 34.

Rigidly secured to the forward ends of the crankshafts 32 and 34 are gears 94 and 95 respectively. The gear 94 meshes with a larger gear 96 fixed to a short shaft 97 journalled in bearing bosses 98 and 99 extending from the crankcase housing 38. These bosses also provide bearings for the front end of the crankshaft 32. In like manner, the gear 95 meshes with gear 100, similar to gear 96, fixed to a short shaft 101, similar to shaft 97, journalled in bearing bosses 102 and 103 extended from the opposite crankcase housing 40. These bosses also provide bearings for the front end of the crankshaft 34. Secured to the shaft 97 forwardly of the gear 96 is a relatively small gear 104 and correspondingly secured to the shaft 101 is a gear 105 similar to the gear 104. The gears 104 and 105 mesh with a gear 106 fixed to a hollow propeller shaft 30.

The propeller shaft 30 is journalled at its rear end at 108 through bearings carried by bosses 98 and 102. Adjacent its outer end, somewhat rearwardly of the point of attachment of the propeller 26 to the propeller shaft 30, the latter is journalled in suitable bearings 109 in the forward end of the concavo-convex end plate 37 attached to the crankcase housing.

Referring to Figs. 5 to 8 inclusive, in these figures idler gears 96 and 100 are shown simply for illustrative purposes as meshing directly with gear 106. These figures illustrate diagrammatically the invention as applied to the reduction gear drive of the preferred embodiment of Figs. 2 and 4. It will be noted that idler gears 96 and 100 are located at opposite sides of an imaginary line A—A passing through the centers of the crankshafts 32 and 34 and the propeller shaft 30. In these figures the assumed direction of rotation of the propeller shaft and crankshafts and associated gearing is indicated by the arrows. Thus, it will be seen that gear 96 is located at one side (below in Figs. 2 and 5) of this crankshaft center line which lies furthest therefrom in the direction of rotation of the propeller shaft. In like manner the gear 100 is located at the opposite side (above in Figs. 2 and 5) of this center line and furthest therefrom in the direction of rotation of the propeller shaft. By thus locating the gear unit 96, 104 and the gear unit 100, 105 in the manner shown at opposite sides of the center line of the crankshafts with respect to the directions of rotation thereof and of the propeller shaft, the loads on the bearings for these gears are materially reduced. By virtue of this construction, there are provided two positive or rigid gear trains so arranged as not only to reduce the size of the bearings but also the idler gears, resulting in a much more compact, efficient and durable transmission.

The terms "idler" and "idler gear" as used in the specification and claims are to be understood as designating a gear or wheel which at the same time is both the driven and the driving element. The idler gear may be of a composite construction and have two rows of teeth cut thereon, thus forming, in effect, two gear portions secured together either bodily or by mounting on a single shaft such as gear portions 104 and 96.

Fig. 6 is a diagrammatic view giving a vector analysis of the forces acting on the bearings of the gear trains shown in Fig. 5. Said Fig. 6 gives the relative magnitude and direction of the load bearing forces only, omitting for the sake of clarity the forces acting on the teeth of the gears and producing said bearing load forces. In order to illustrate the derivation of the load bearing forces illustrated in Fig. 6, a complete vector analysis of all of the forces, which is to say including both the gear teeth forces and the load bearing forces produced thereby, is illustrated in Fig. 9.

Referring to Fig. 9, the same gives a complete vector analysis of forces for the right hand side of Fig. 6, which is to say, the right hand side from the vertical center line of driven gear 106, thus including gears 100 and 95. It will be understood that the operation and the conditions of the forces on the left hand side of Fig. 6 are similar to those illustrated in Fig. 9 and therefore complete analysis of forces for the left hand side of the structure is omitted in order to permit the analysis of Fig. 9 to be presented on a larger scale. Referring to Fig. 9, the same shows the crankshaft driving gear 95 meshing with the idler 100 which, in turn, meshes with the driven gear 106. By virtue of such a construtcion the driving gear 95 is drivingly connected to the driven gear 106 through the idler 100.

Referring now to the portion of Fig. 9 which illustrates two teeth of the driving gear 95 and the idler 100 in driving contact, it will be appreciated that the driving tooth of the gear 95 exerts driving pressure on the driven tooth of the idler 100. The force produced by the driving tooth of the gear 95 is applied at a point P and is represented by the character $n$. It is understood in the art of gear design that the pressure forces as well as reactions produced thereby act in directions perpendicular to the surfaces of contact and therefore said directions are determined by the angle of pressure designated in Fig. 9 by A and depending upon the character of the tooth. In the involute system said angle is constant for any given system and is equal usually to $14\frac{1}{2}°$ or $20°$. The magnitude of the force $n$ depends upon the torque delivered by the driving gear 95, and it may be represented in any desired scale. It should be understood at this point that the length of the vector lines is only relative. The pressure exerted by the driving tooth of the gear 95 is resisted at said point P by the driven tooth of the idler 100 and the reactive force $m$ produced by said tooth is equal and opposite to said driving force $n$. Each of said forces $n$ and $m$ may be resolved into two components giving a radial thrust component and a rotative component for the force $n$, and an idler tooth reaction to said rotative component, as well as a radial reaction to said radial thrust for the force $m$. For the purpose of general information it may be stated at this point that the value of the rotative component expressed in units of weight and multiplied by the distance thereof from the center gear expressed in units of length, gives the value of torque produced by the gear, while the value of said rotative component multiplied by the distance it covers in rotation, gives value for the energy so produced. The value for the energy produced when divided by the time element involved, gives the value for power delivered.

The pressure at the tooth contact point P is opposed by the supporting bearings. Therefore, the force $n$ is opposed by the bearing of the idler 100 and it produces thereon a load represented by the vector line $b$. On the other hand, the reactive force $m$ is opposed by the bearing of the driving gear 95 and it exerts thereon a bearing load force indicated in Fig. 9 by the character $q$.

Referring now to the portion of Fig. 9 illustrating the contact of a driving tooth of the driven idler 100 with the driven tooth of the driven gear 106, and applying thereto the same analysis as given above, it will be understood that the said driving tooth exerts on said driven tooth a force which may be termed the idler tooth pressure force and which is represented in Fig. 9 by the character $r$, which force is opposed by the driven gear bearing and produces a load force thereon indicated in Fig. 9 by the character $s$. On the other hand, the driven tooth of the gear 106 opposes the action of the force $r$ with an equal and opposite reactive force indicated in Fig. 9 by the character $t$, which force is opposed by the bearing of the idler 100 and produces thereon a load force indicated in Fig. 9 by the vector line $a$.

It will now be clear in view of the foregoing that the total load on the bearing of the idler 100 is the result of the action of the load forces represented by the vectors $a$ and $b$ producing the resultant force represented by the vector $c$.

With the above analysis in view, consideration of Fig. 6 may now be undertaken. Referring to said Fig. 6, vector $b$ represents the load on the bearing of the idler 100 due to the pressure of the driving tooth of the gear 95, while the vector $a$ represents the load on the bearing of said idler 100 due to the reaction of the driven tooth of the propeller shaft gear 106. The action of said forces represented by the vectors $a$ and $b$ is equal in direction and magnitude to the force represented by the resultant vector $c$. Similarly the vector $e$ represents the load on the bearing of the idler gear 96 produced by the pressure of the driving tooth of the driving gear 94 on the driven tooth of said idler 96. The vector $d$ represents the load produced by the reactive force of the driven tooth of the propeller shaft gear 106 exerted on the driving tooth of the gear 96. The vector $e$ represents the load on the bearing of the idler gear 96 produced by the pressure of the driving tooth of the gear 94, while the resultant of said forces is represented by vector $f$. Assuming the direction of rotation of gears 95 and 94 as illustrated in Fig. 6 and assuming further that the torques delivered by said gears are equal, the magnitude and direction of the forces represented by vectors $c$ and $f$ is equal and opposite. Since vectors $a$ and $b$, as well as $d$ and $e$ act at a relatively large angle to each other, their resultant vectors $c$ and $f$ are relatively small, and therefore the net loads on the bearings of the idler gears 100 and 96 are not large and said bearings may have relatively light construction and be arranged in a relatively small space.

In addition, the load forces produced on the bearing of the propeller shaft gear 106 due to the pressure of the driivng teeth of the idler gears 100 and 96 (said forces being represented in Fig. 9 by characters $s$ and $u$) are equal and may be considered as applied at the same point but in opposite directions. Therefore, said load forces $s$ and $u$ cancel each other, and the load on the bearing of the propeller shaft gear is negligible.

It will be noted that the gears 94 and 95 as well as the propeller shaft gear 106 are arranged with their centers located on the straight center line A—A. In order to produce equal forces represented by the vectors $c$ and $f$, idler gears 100 and 96 as well as driving gears 94 and 95 are respectively similar. By virtue of such a construction the respective centers of the idler gears 100 and 96 are located at the same distances from said line A—A.

Fig. 7 is a diagrammatic view giving vector analysis of the bearing load forces on a set of gears in which the idler gears $100a$ and $96a$ are arranged on the opposite sides of the line A—A connecting the centers of the driving gears 94 and 95, with relation to the arrangement of Fig. 6. Due to the changed relationship between the rotation of the gears and the new positions of the idler gears in the arrangement of Fig. 7, the vectors $a'$ and $b'$ as well as vectors $e'$ and $d'$ add together at a much smaller angle to produce the respective resultant forces represented by characters $c'$ and $f'$. Because of such smaller angle the forces represented by said vectors $a'$ and $b'$ as well as $e'$ and $d'$ are acting more in one direction than is the case of corresponding vectors $a$ and $b$ as well as $e$ and $d$ of Fig. 6. Therefore, the force represented by the vector $c'$ in Fig. 7 is considerably greater than the force represented by the vector $c$ in Fig. 6, thus giving a much greater load on the bearing of idler $100a$ than is produced by the force $c$ on idler 100. Similarly the load on the bearing of the idler 96a represented by the vector f' is correspondingly greater than the load on the bearing of the idler 96 represented by the vector f. It will be noted however that in spite of the fact that said forces c' and f' are considerably greater than the forces c and f, they are still substantially equal to each other and therefore the bearings of the idlers 96a and 100a may have equal dimensions which may be an important advantage in the construction of an engine. It will also be noted that in the arrangement illustrated in Fig. 7, the loads on the bearing of the propeller shaft gear 106 may be considered as applied at the same point in opposite directions, thereby cancelling each other, theoretically giving a zero load on said bearing. Therefore, with respect to the bearing load on the propeller shaft gear 106 the structure of Fig. 7 possesses the same advantages as the structure of Fig. 6.

Referring now to Fig. 8 which does not involve invention but which has been included in the drawings in order to enable those skilled in the art to understand more clearly the advantages of the structures shown diagrammatically in Figs. 6 and 7, it will be understood that if both idler gears 96b and 100b are moved to the same side of the center line A—A as is shown in said Fig. 8, a number of serious disadvantages will result. It can be clearly seen from an examination of said Fig. 8 that vectors a'', b'' and c'' are identical in their magnitudes and directions with the vectors a, b and c of Fig. 6. On the other hand, the vectors d'', e'' and f'' are substantially identical with the vectors d', e' and f' of Fig. 7. Thus the bearing load forces c'' and f'' are different in magnitude, and therefore the bearings of the idlers 96b and 100b must be made of different constructions to take care of different loads acting thereon. Since the load on the bearing of the idler 96b would be approximately twice as large as the load on the bearing of the idler 100b, there may not be enough space between the gears 94 and 106 to accommodate such increased size bearing or gear. The foregoing may also be true with respect to idler gears 96a and 100a of Fig. 7. However, in the arrangement illustrated in Fig. 8 an additional disadvantage is produced as compared with the arrangement of Figs. 6 and 7 by the fact that the bearing loads on the bearing of the propeller shaft gear 106 in Fig. 8 do not cancel each other but add together to produce a relatively large resultant force which requires a stronger bearing than is necessary with constructions shown in said Figs. 6 and 7.

It should be understood that by placing idler gears such as 100 or 96 between the driving and the driven gears in such a way that the centers of all of said gears are located on said line A—A, it would be possible to produce a condition whereby bearing loads on the idler gear bearings would also cancel each other. However, it is impossible in practice to avail one's self of such a solution, since the space between the driving and driven gears is very limited and such idler gears would have to be made impractically small. It should also be understood that the vector analysis of bearing loads given in Figs. 6 and 9 is also applicable to the condition when instead of two engines driving a single propeller shaft, the condition is reversed and one engine is driving several propeller shafts. Therefore, the present specification as well as each of the following claims are not limited to two shafts driving a single shaft, but should be construed as applicable to the reversed condition, namely when one engine shaft drives several propeller shafts.

I claim:

1. In a power transmitting mechanism, a pair of parallel driving shafts, a driven shaft arranged on a center line parallel to the center lines of said driving shafts and at an equal distance from each of said lines and in the plane thereof, a driven gear on said driven shaft and a driving gear on each of said driving shafts, and a single idler gear between each of said driving gears and said driven gear for drivingly connecting the same, said driving gears and said idler gears being respectively of substantially identical dimensions, said idler gears being arranged on opposite sides of the line connecting the centers of said driving gears and each in such relation to its driving gear and to the rotation of said shafts that the direction of the gear tooth pressure of each driving gear on its idler gear is toward the driven gear and the direction of the load on each idler gear bearing due to the driving gear tooth pressure on the idler gear is in a direction toward the driven gear.

2. In a power transmitting mechanism, a pair of parallel driving shafts, a driven shaft arranged on a center line parallel to the center lines of said driving shafts and at an equal distance from each of said lines and in the plane thereof, a driven gear on said driven shaft and a driving gear on each of said driving shafts, and a single idler gear between each of said driving gears and said driven gear for drivingly connecting the same, said driving gears and said idler gears being respectively of substantially identical dimensions, said idler gears being arranged on opposite sides of the line connecting the centers of said driving gears and each in such relation to its driving gear that the included angle between the line connecting the centers of said driving and driven shafts and the line connecting the center of each idler gear and its meshing driving gear is materially less than a right angle and said included angles being equal.

3. In a power transmitting mechanism, a pair of parallel driving shafts, a driven shaft arranged on a center line parallel to the center lines of said driving shafts and at an equal distance from each of said lines and in the plane thereof, a driven gear on said driven shaft and a driving gear on each of said driving shafts, and a single idler gear between each of said driving gears and said driven gear for drivingly connecting the same, said driving gears and said idler gears being respectively of substantially identical dimensions, said idler gears being arranged on opposite sides of the line connecting the centers of said driving gears and each in such relation to its driving gear and to the rotation of said shafts that the direction of the gear tooth pressure of each driving gear on its idler gear is toward the driven gear and the direction of the load on each idler gear bearing due to the driving gear tooth pressure on the idler gear is in a direction toward the driven gear, the included angle between the line connecting the centers of said driving and driven shafts and the line connecting the center of each idler gear with its meshing driving gear being materially less than a right angle and said included angles being equal.

CARL F. RAUEN.